3,380,866
METHOD OF JOINING POLYESTER RESIN
STRUCTURES USING FOAMABLE POLY-
ESTER ADHESIVE
Thomas O. Ginter, Midland, Mich., assignor to The Dow
Chemical Company, Midland, Mich., a corporation of
Delaware
No Drawing. Filed Nov. 4, 1964, Ser. No. 408,755
4 Claims. (Cl. 156—79)

ABSTRACT OF THE DISCLOSURE

Bond burn in gluing to polyester sheets is eliminated by adding blowing agent to the polyester adhesive.

This invention relates to the fabrication of structures from thermoset reinforced resins. More particularly, it concerns an improved method and material for joining together the various components of the complete structure.

Thermosettable resins such as the polyester resins reinforced with fibrous materials such as glass fibers and asbestos have gained widespread use in the fabrication of boats, automotive bodies, flumes, ducts, and the like. Owing to the high tensile strength and impact resistance of these reinforced resins, it has been possible to fabricate structures having adequate strength with comparatively thin walls.

The flexibility of these thin walls has made it necessary to provide stiffeners for some of the panels. Various techniques have been used to stiffen panels and increase their rigidity. For some uses the member can be corrugated to prevent buckling. In other applications requiring a smooth surface it has been possible to use two layers of the reinforced resin with a rigid foam or honeycomb sandwiched between the resin layers. Smooth panels such as those on boat hulls and car bodies are commonly stabilized by attaching ribs as stiffeners to the rear or unexposed side of the panel. These ribs which can have the shape of an angle, open channel, enclosed channel, or the like are customarily made of the reinforced resin and are bonded to the panel with a thin layer of the resin.

The attachment of these ribs or stiffeners to the panel produces a distortion of the panel which is sometimes referred to as "bond burn." The panel is distorted by stresses which develop in the bonding layer as the polyester resin cures. The wrinkles which appear opposite each stiffener have been said to have the appearance of the ribs of a starved horse. The wrinkles can be removed by sanding, however this is an additional expense and weakens the structure to some extent owing to the removal of a portion of the reinforced composite.

I have discovered a means for bonding stiffeners to reinforced polyester resin panels which substantially eliminates the stress distortion. According to my invention a polyester adhesive containing a blowing agent is used to bond the stiffener to the smooth panel. A solid or liquid blowing agent intimately mixed with the adhesive effectively reduces the stresses which develop as the resin cures, thereby eliminating the distortion of the smooth surfaces.

The blowing agent can be used with any of the polyester resins which are commonly used as an adhesive in bonding the reinforced resin components together. The polyester adhesives typically comprise a polyester backbone having unsaturated linkages, dissolved in a vinyl monomer such as styrene. These adhesive solutions might contain, e.g., 40 percent styrene monomer and 60 percent polyester solids. In addition to these reactive ingredients, various fillers and pigments such as clay, mica, asbestos, silica flour, calcium carbonate and dye-stuffs can be mixed with the adhesive. Various accelerators and catalysts are frequently added to the resin shortly before it is used to speed up the curing process at room temperature.

There are numerous blowing agents which can be added to the adhesive mixture to reduce stresses and distortion. Any liquid having a boiling point below about 180° F. which is miscible with the adhesive mixture and is not reactive with any of the resin components can be used as the blowing agent. Suitable liquids are methanol, ethanol, acetone, methyl ethyl ketone, pentane, neopentane, butane, hexane, methylene chloride, methyl chloride, chloroform, ethylene dichloride, ethyl chloride, methyl formate and the halogenated products such as trichloromonofluoro methane, dichloromonofluoro methane, dichlorotetrafluoro ethane and trichlorotrifluoro ethane. Solid blowing agents which decompose and release a gas such as nitrogen at the elevated temperatures produced by the exotherm of the adhesive also may be used. Nitrogen-releasing compounds which are suitable blowing agents for this novel adhesive composition are diazoaminobenzene, benzenesulfonyl-hydrazide, azobis-isobutyronitrile, N,N'-dimethyl-N,N'-dinitrosoterephthalamide, benzene-1,-3-disulfonyl hydrazide and diphenylsulfon-3,3'-disulfonyl hydrazide.

Adhesive mixtures were prepared from commercial polyester solutions containing 40 percent vinyl monomer and 60 percent polyester solids. Clay and/or asbestos fillers were added to some of the mixtures. The samples were prepared in two parts, an accelerated portion and a catalyst portion. The clay was added to those samples containing that filler before the sample was divided. Benzoyl peroxide was mixed with the resin solution to produce the catalyzed portion then the asbestos was added to those samples containing it as a filler. The blowing agent was then added to the catalyzed portion. Because some of the highly volatile blowing agent is lost in the mixing step, the resin was weighed before and after the mixing and additional blowing agent added if there had been a significant loss.

The accelearted portion was prepared in the same manner as the catalyzed portion with the exception that N,N-dimethylaniline was added as an accelerator in place of the peroxide catalyst. The accelerated portion contained 2.0 percent accelerator based on the weight of the polyester and styrene. The catalyzed portion contained 3.4 percent of the peroxide.

The adhesive resin was prepared by combining equal parts by weight of the catalyzed and accelerated portions. The compositions of these samples are shown in Table 1.

TABLE 1.—POLYESTER-VINYL MONOMER ADHESIVES

| Sample No. | Adhesive Composition, Wt. Percent | | | | Bond Burn * | Bond Strength (p.s.i.) |
|---|---|---|---|---|---|---|
| | Polyester | Asbestos | Clay | Blowing Agent | | |
| 1 | 73.0 | 27.0 | | | E | 837 |
| 2 | 70.0 | 26.0 | | 4.0 F-11 | D | 820 |
| 3 | 67.0 | 25.0 | | 8.0 F-11 | A | 815 |
| 4 | 72.0 | 27.0 | | 1.0 AIBN | D | |
| 5 | 68.9 | 24.0 | | 6.0 F-11 plus 0.1 AIBN | B | |
| 6 | 53.0 | 20.0 | 21.0 | 6.0 methanol | B | 790 |
| 7 | 54.0 | 21.0 | 21.0 | 4.0 F-11 | C | |
| 8 | 53.0 | 20.0 | 21.0 | 6.0 F-11 | B | 1,050 |
| 9 | 53.0 | 20.0 | 20.0 | 7.0 F-11 | A | |
| 10 | 52.0 | 20.0 | 20.0 | 8.0 F-11 | D—R | |
| 11 | 73.0 | 27.0 | | | E | |
| 12 | 70.0 | 26.0 | | 4.0 F-11 | D | |
| 13 | 69.0 | 25.0 | | 6.0 F-11 | C | |
| 14 | 68.5 | 24.5 | | 7.0 F-11 | B | |
| 15 | 68.0 | 24.0 | | 8.0 F-11 | A | |
| 16 | 67.0 | 23.0 | | 10.0 F-11 | D—R | |
| 17 | 73.0 | 27.0 | | | E | |
| 18 | 67.0 | 25.0 | | 8.0 F-11 | A | |
| 19 | 53.0 | 20.0 | 21.0 | 6.0 F-113 | B | |
| 20 | 53.0 | 20.0 | 21.0 | 6.0 methanol | B | |
| 21 | 72.0 | 27.0 | | 1.0 AIBN | D | |

*A—nil, B—very slight, C—slight, D—moderate, E—severe, R—reverse.
F-11—trichloromonofluoro methane.
F-113—trichlorotrifluoro ethane.
AIBN—Azobisisobutyronitrile.

Samples 1 through 16 were prepared from a commercial product containing 40% styrene monomer and 60% polyester resin solids, the polyester having the following approximate composition: 47 mol percent isophthalate, 51% fumarate and 2% maleate of a glycol mixture containing 20 weight percent ethylene glycol and 80% diethylene glycol. Samples 17 through 21 were prepared from a solution containing 40% ortho chlorostyrene and 60% polyester resin solids. The polyester was a mixture containing 43 mol percent isophthalate 52% fumarate and 5% maleate of a glycol mixture containing 80 weight percent diethylene glycol and 20% ethylene glycol.

Each of these samples was evaluated with a flat reinforced panel of cured polyester resin 0.100 inch thick, having one smooth surface and one surface roughened by sand blasting. A ⅝ inch x ⅝ inch right angle strip 9 inches long and 0.100 inch thick was bonded to the sand blasted side of the panel. A bead of resin approximately ⅝ inch wide and ⅝ inch high was applied to the panel then the right angle strip was pressed against the bead, leaving a layer of resin about 0.060 inch thick between the bonded surfaces. The panel was spray painted then placed in an oven at 140° C. for 30 minutes.

After removing the panel from the oven and allowing it to cool to room temperature, the bond burn or distortion of the smooth surface was measured with a surface gage. The degrees of bond burn listed in Table 1 correspond to the following quantitative values in fractional inch of distortion: severe—over .015; moderate—.010 to .015; slight—.006 to .010; very slight—.001 to .006; nil—.000 to .001. The reverse bond burns represent a qualitative change in the distortion which is obtained with adhesives containing an excess of blowing agent.

The bond strengths listed in Table 1 were determined according to ASTM D-1002-53T. The values reported are the averages of tests with 3 to 5 specimens. The values in pounds per square inch (p.s.i.) were determined at a pull rate of 0.05 in./min. with the exception of Sample No. 8 which was determined at a pull rate of 0.1 in./min.

The amount of blowing agent used in the practice of this invention is from about one percent to about 13 percent of the weight of the polyester adhesive. About one percent of an appropriate solid nitrogen releasing agent reduces distortion by a factor of about 50% and about two percent results in negligible distortion, although as much as three percent of the solid agent can be used advantageously in some formulations. The optimum amount of blowing agent will vary with the composition of the adhesive. Owing to their fugacious tendency in the adhesive, the liquid blowing agents must be used in somewhat higher concentrations than the solid agents to obtain the same degree of reduction in distortion. About 4% of a liquid agent might produce about a 50% reduction whereas 8–10% will produce negligible distortion in a particular adhesive composition. Between about 6 and 8% of a liquid blowing agent usually provides optimum reduction in bond burn with the common polyester adhesives containing 40–50% vinyl monomers and 20–50% fillers. Higher contents of a solid or liquid blowing agent can be used. However, reverse bond burn might occur and the strength of the bond is lower at substantially higher contents. In some instances it is desirable to use a mixture of blowing agents to obtain better miscibility, volatility, or the like.

The degree of bond burn, in the absence of a blowing agent, is proportional to the concentration of vinyl monomer in the adhesive composition, owing to the shrinkage which accompanies the vinyl polymerization. Thus, adhesives containing more or less than the 40% vinyl monomer of the samples of Table 1 would require a corresponding adjustment in the blowing agent content. Fillers such as the clay and asbestos in the samples of Table 1 permit a reduction in the amount of blowing agent required to prevent bond burn for the reason that these filled compositions contain a lesser amount of the vinyl monomer. This can be seen in the comparison of samples numbers 9 and 15 wherein the former produced nil bond burn with 7% F-11 blowing agent and 40% fillers and the latter required 8% F-11 with only 24% filler to avoid bond burn.

From the foregoing it can be seen that stiffeners can be bonded to flexible polyester resin panels without producing wrinkles in the panel by the simple expedient of mixing a quantity of a blowing agent to the polyester adhesive solution. While this invention has been described with particular reference to the attachment of stiffening ribs to flexible panels, it should be understood that it can also be practiced in the fabrication of structures by joining multiple thermoset components. In such instances the various components can be bonded together into the composite structure with a polyester adhesive without the danger of distortion as the adhesive is cured. Also, the novel adhesive system can be used with flexible thermoset resins other than the polyesters. The exotherm and shrinkage which occur as the vinyl monomer in the adhesive undergoes polymerization cause the adhesive to wrinkle the thermoset panel in the absence of the blowing agent. Stiffeners can be bonded to panels made of epoxy, phenolic and melamine resins with the adhesive containing a blowing agent according to this invention without the problem of bond burn.

Although all of the samples of Table 1 contained asbestos as a filler, it should be understood that asbestos is not essential to reduce bond burn or distortion. The fibrous asbestos imparts thixotropy or gel strength to the fluid adhesive so that there is less run-down and sagging of the freshly-applied adhesive.

I claim:
1. A method of cementing ribs to a flexible panel of thermoset resin with an adhesive composition comprising a solution of a polyester resin in a vinyl monomer reactive therewith, at least one of the structural components being subject to bond burn, the steps of the method comprising disposing a layer of the polyester adhesive containing a vinyl monomer between surfaces of the components to be joined,
pressing the surfaces toward each other,
curing the polyester adhesive containing the vinyl monomer, the improvement which comprises
mixing from about one to about 13 percent of a blowing agent with the adhesive prior to pressing the surfaces together.

2. The method of claim 1 wherein said adhesive composition is a polyester resin dissolved in styrene monomer and contains fibrous asbestos together with from 4 to 8 percent of a liquid blowing agent.

3. The method of claim 1 wherein from 4 to 8 percent of a liquid blowing agent is employed.

4. The method of claim 1 wherein from about 1 to 3 percent of a solid blowing agent which decomposes and releases nitrogen at the exotherm temperature of said adhesive is employed.

References Cited

UNITED STATES PATENTS

| | | | |
|---|---|---|---|
| 2,529,512 | 11/1950 | Ott | 260—2.5 |
| 2,576,073 | 11/1951 | Krapa et al. | 154—128 |
| 3,218,273 | 11/1965 | Montesano | 260—2.5 |
| 3,260,688 | 7/1966 | Watanabe et al. | 260—2.5 |

MURRAY TILLMAN, *Primary Examiner.*

SAMUEL H. BLECH, *Examiner.*

J. T. GOOLKASIAN, *Assistant Examiner.*